(12) United States Patent
McIntosh

(10) Patent No.: US 7,506,326 B2
(45) Date of Patent: Mar. 17, 2009

(54) METHOD AND APPARATUS FOR CHOOSING REGISTER CLASSES AND/OR INSTRUCTION CATEGORIES

(75) Inventor: Ronald Ian McIntosh, Toronto (CA)

(73) Assignee: International Business Machines Corporation, Armonk, NY (US)

(*) Notice: Subject to any disclaimer, the term of this patent is extended or adjusted under 35 U.S.C. 154(b) by 515 days.

(21) Appl. No.: 11/074,131

(22) Filed: Mar. 7, 2005

(65) Prior Publication Data

US 2006/0200810 A1    Sep. 7, 2006

(51) Int. Cl.
  *G06F 9/45* (2006.01)
(52) U.S. Cl. .................. 717/140; 717/144; 717/151; 717/152; 717/155; 717/156; 717/159; 717/161
(58) Field of Classification Search .................. 717/140, 717/144, 151, 152, 155, 156, 159, 161
See application file for complete search history.

(56) References Cited

U.S. PATENT DOCUMENTS

| | | | | |
|---|---|---|---|---|
| 5,659,785 | A | 8/1997 | Pechanek et al. | 395/800.11 |
| 6,175,892 | B1 | 1/2001 | Sazzad et al. | 711/100 |
| 6,266,758 | B1 | 7/2001 | van Hook et al. | 712/2 |
| 6,735,690 | B1 * | 5/2004 | Barry et al. | 712/244 |
| 7,139,897 | B2 * | 11/2006 | Keltcher et al. | 712/24 |
| 2003/0074654 | A1 * | 4/2003 | Goodwin et al. | 717/161 |
| 2003/0140335 | A1 | 7/2003 | Li et al. | 717/140 |
| 2004/0003381 | A1 | 1/2004 | Suzuki et al. | 717/150 |
| 2004/0054879 | A1 | 3/2004 | Macy, Jr. et al. | 712/221 |
| 2004/0064810 | A1 | 4/2004 | Wang et al. | 717/159 |

FOREIGN PATENT DOCUMENTS

JP    2003-202991    7/2003

* cited by examiner

*Primary Examiner*—Wei Y Zhen
*Assistant Examiner*—Qamrun Nahar
(74) *Attorney, Agent, or Firm*—Yee & Associates, P.C.; Libby Z. Handelsman

(57) ABSTRACT

An improved method, apparatus, and computer instructions for generating instructions to process multiple similar expressions. Parameters are identified for the expressions in the original instructions, to form a set of identified parameters typically including the operations performed, the types of data used, and the data sizes. Each type of execution unit that can execute the instructions needed to process the expressions using the set of identified parameters is identified, wherein a set of identified execution unit types is formed. An execution unit type from the set of identified execution unit types is selected to meet a performance goal. The new instructions are generated for the selected execution unit type to process the expressions, and the original instructions for the expressions are discarded.

23 Claims, 12 Drawing Sheets

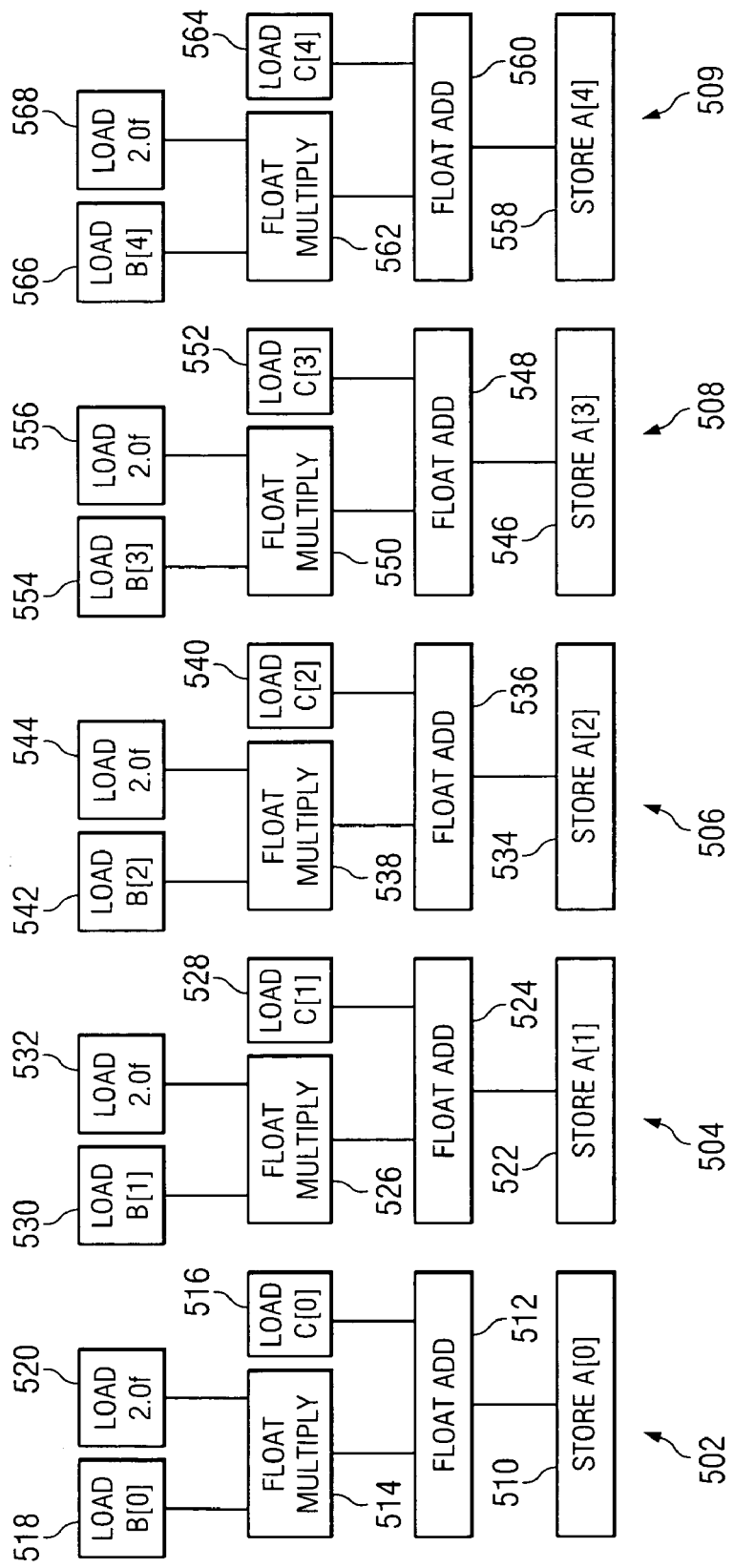

METHOD AND APPARATUS FOR CHOOSING REGISTER CLASSES AND/OR INSTRUCTION CATEGORIES

BACKGROUND OF THE INVENTION

1. Technical Field

The present invention relates generally to an improved data processing system and in particular to a method, apparatus, and computer instructions for generating instructions to optimize execution of a program.

2. Description of Related Art

In executing computer programs, the speed at which a program can be executed is often an important feature or benchmark. A number of different techniques are used to improve the efficiency at which instructions in a program are executed. One technique involves issuing multiple instructions per cycle to increase parallel processing by a processor. Another technique involves using a single-instruction, multiple-data (SIMD) design in which the processor performs the same operation on multiple sets of data operands using a single instruction. For example, a processor with SIMD support can treat data in long registers as multiple smaller words on which it performs the same operation and generates multiple independent outputs. In this example, the long registers may be 64 bit registers with the smaller words being four 16 bit words, or other sizes. Where the data sizes involved are smaller than the size of a register or smaller than the maximum size of a memory-to-memory instruction, the program will usually run faster if the compiler optimizer merges or widens these multiple "narrow" operations into a smaller number of "wide" operations.

Producing SIMD instructions automatically during optimization is often called "AutoSIMDization" or "Short Vector AutoSIMDization". The optimizer must choose an acceptable and preferably optimal new sequence of instructions to do this, and one aspect of that is to choose what kind of registers and/or instruction category to use. There are various criteria and issues, depending on the computer architecture the program will execute on. The decisions can be complicated, especially for optimizers designed to handle programs for more than one architecture or for machine families with optional features.

Therefore, it would be advantageous to have an improved method, apparatus, and computer instructions for generating instructions to execute a program.

SUMMARY OF THE INVENTION

The present invention provides an improved method, apparatus, and computer instructions for generating instructions to process multiple similar expressions. Parameters are identified for the expressions in the original instructions, to form a set of identified parameters typically including the operations performed, the types of data used, and the data sizes. Parameters also are identified for the computer on which the instructions will be executed, implying which execution units, associated register classes and instruction categories are available. Each type of execution unit that can execute the instructions needed to process the expressions using the set of identified parameters is identified, wherein a set of identified execution unit types is formed. An execution unit type from the set of identified execution unit types is selected to meet a performance goal. The new instructions are generated for the selected execution unit type to process the expressions, to replace the original instructions for the expressions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5-11 are examples of expressions containing instructions, the generation of trees from the instructions, and resulting trees for using in generating new instructions in accordance with an illustrative embodiment of the present invention;

DETAILED DESCRIPTION OF THE PREFERRED EMBODIMENT

Figure 1:
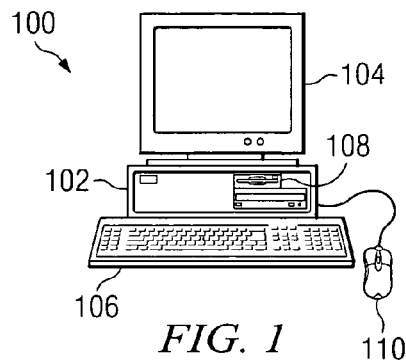
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
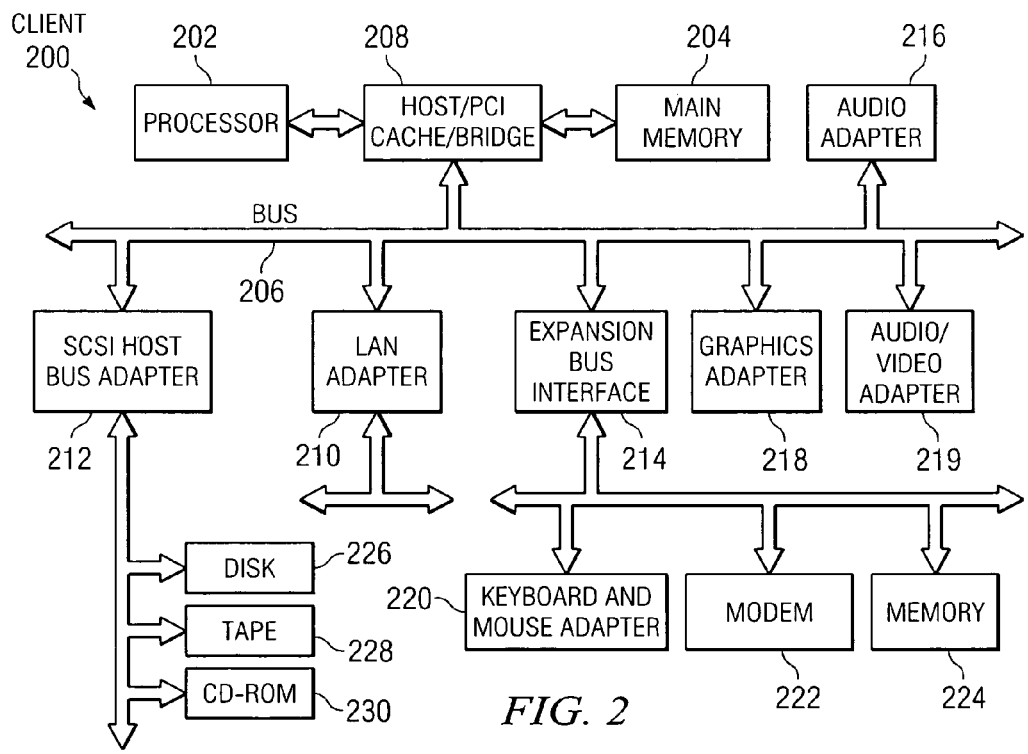
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
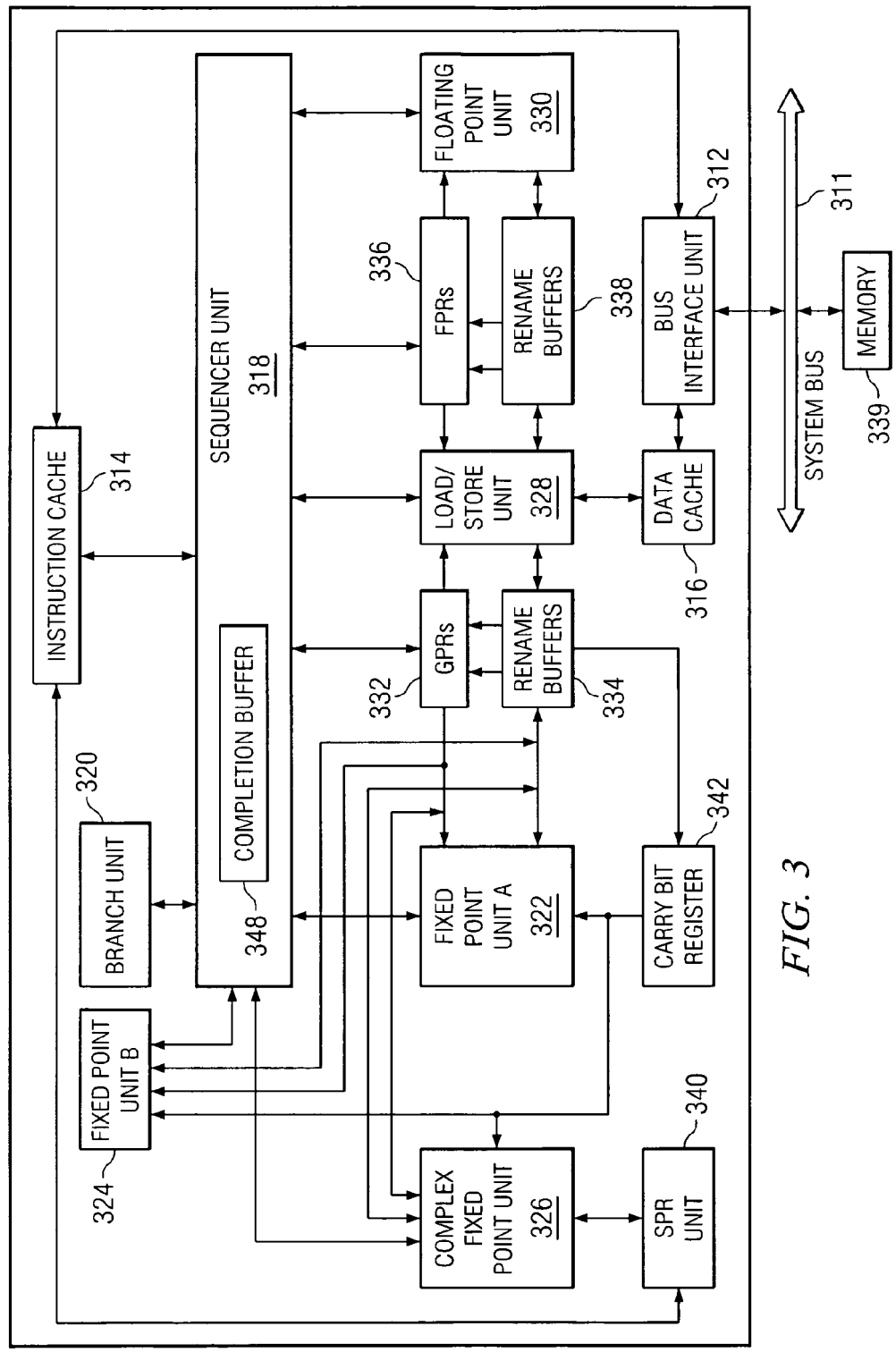
FIG. 3 is a block diagram of a processor system for processing information according to the preferred embodiment.

FIG. 3 is a block diagram of a processor system for processing information according to the preferred embodiment. In the preferred embodiment, processor 310 is a single integrated circuit superscalar microprocessor. Accordingly, as discussed further herein below, processor 310 includes various units, registers, buffers, memories, and other sections, all of which are formed by integrated circuitry. Also, in the preferred embodiment, processor 310 operates according to reduced instruction set computer ("RISC") techniques. As shown in FIG. 3, a system bus 311 is connected to a bus interface unit ("BIU") 312 of processor 310. BIU 312 controls the transfer of information between processor 310 and system bus 311.

BIU 312 is connected to an instruction cache 314 and to a data cache 316 of processor 310. Instruction cache 314 outputs instructions to a sequencer unit 318. In response to such instructions from instruction cache 314, sequencer unit 318 selectively outputs instructions to other execution circuitry of processor 310.

In addition to sequencer unit 318, in the preferred embodiment, the execution circuitry of processor 310 includes multiple execution units, namely a branch unit 320, a fixed-point unit A ("FXUA") 322, a fixed-point unit B ("FXUB") 324, a complex fixed-point unit ("CFXU") 326, a load/store unit ("LSU") 328, and a floating-point unit ("FPU") 330. FXUA 322, FXUB 324, CFXU 326, and LSU 328 input their source operand information from general-purpose architectural registers ("GPRs") 332 and fixed-point rename buffers 334. Moreover, FXUA 322 and FXUB 324 input a "carry bit" from a carry bit ("CA") register 342. FXUA 322, FXUB 324, CFXU 326, and LSU 328 output results (destination operand information) of their operations for storage at selected entries in fixed-point rename buffers 334. Also, CFXU 326 inputs and outputs source operand information and destination operand information to and from special-purpose register processing unit ("SPR unit") 340.

FPU 330 inputs its source operand information from floating-point architectural registers ("FPRs") 336 and floating-point rename buffers 338. FPU 330 outputs results (destination operand information) of its operation for storage at selected entries in floating-point rename buffers 338.

In response to a Load instruction, LSU 328 inputs information from data cache 316 and copies such information to selected ones of rename buffers 334 and 338. If such information is not stored in data cache 316, then data cache 316 inputs (through BIU 312 and system bus 311) such information from a system memory 339 connected to system bus 311. Moreover, data cache 316 is able to output (through BIU 312 and system bus 311) information from data cache 316 to system memory 339 connected to system bus 311. In response to a Store instruction, LSU 328 inputs information from a selected one of GPRs 332 and FPRs 336 and copies such information to data cache 316.

Sequencer unit 318 inputs and outputs information to and from GPRs 332 and FPRs 336. From sequencer unit 318, branch unit 320 inputs instructions and signals indicating a present state of processor 310. In response to such instructions and signals, branch unit 320 outputs (to sequencer unit 318) signals indicating suitable memory addresses storing a sequence of instructions for execution by processor 310. In response to such signals from branch unit 320, sequencer unit 318 inputs the indicated sequence of instructions from instruction cache 314. If one or more of the sequence of instructions is not stored in instruction cache 314, then instruction cache 314 inputs (through BIU 312 and system bus 311) such instructions from system memory 339 connected to system bus 311.

In response to the instructions input from instruction cache 314, sequencer unit 318 selectively dispatches the instructions to selected ones of execution units 320, 322, 324, 326, 328, and 330. Each execution unit executes one or more instructions of a particular class of instructions. For example, FXUA 322 and FXUB 324 execute a first class of fixed-point mathematical operations on source operands, such as addition, subtraction, ANDing, ORing and XORing. CFXU 326 executes a second class of fixed-point operations on source operands, such as fixed-point multiplication and division. FPU 330 executes floating-point operations on source operands, such as floating-point multiplication and division.

As information is stored at a selected one of rename buffers 334, such information is associated with a storage location (e.g. one of GPRs 332 or CA register 342) as specified by the instruction for which the selected rename buffer is allocated. Information stored at a selected one of rename buffers 334 is copied to its associated one of GPRs 332 (or CA register 342) in response to signals from sequencer unit 318. Sequencer unit 318 directs such copying of information stored at a selected one of rename buffers 334 in response to "completing" the instruction that generated the information. Such copying is called "writeback."

As information is stored at a selected one of rename buffers 338, such information is associated with one of FPRs 336. Information stored at a selected one of rename buffers 338 is copied to its associated one of FPRs 336 in response to signals from sequencer unit 318. Sequencer unit 318 directs such copying of information stored at a selected one of rename buffers 338 in response to "completing" the instruction that generated the information.

Processor 310 achieves high performance by processing multiple instructions simultaneously at various ones of execution units 320, 322, 324, 326, 328, and 330. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 318 selectively inputs (from instruction cache 314) one or more instructions from one or more memory addresses storing the sequence of instructions discussed further hereinabove in connection with branch unit 320, and sequencer unit 318.

In the decode stage, sequencer unit 318 decodes up to four fetched instructions. In the dispatch stage, sequencer unit 318 selectively dispatches up to four decoded instructions to selected (in response to the decoding in the decode stage) ones of execution units 320, 322, 324, 326, 328, and 330 after reserving rename buffer entries for the dispatched instructions' results (destination operand information). In the dispatch stage, operand information is supplied to the selected execution units for dispatched instructions. Processor 310 dispatches instructions in order of their programmed sequence.

In the execute stage, execution units execute their dispatched instructions and output results (destination operand information) of their operations for storage at selected entries in rename buffers 334 and rename buffers 338 as discussed further hereinabove. In this manner, processor 310 is able to execute instructions out-of-order relative to their programmed sequence.

In the completion stage, sequencer unit 318 indicates an instruction is "complete." Processor 310 "completes" instructions in order of their programmed sequence.

In the writeback stage, sequencer 318 directs the copying of information from rename buffers 334 and 338 to GPRs 332 and FPRs 336, respectively. Sequencer unit 318 directs such copying of information stored at a selected rename buffer. Likewise, in the writeback stage of a particular instruction, processor 310 updates its architectural states in response to the particular instruction. Processor 310 processes the respective "writeback" stages of instructions in order of their programmed sequence. Processor 310 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 326) may require more than one cycle. Accordingly, a variable delay may occur between a particular instruction's execution and completion stages in response to the variation in time required for completion of preceding instructions.

A completion buffer 348 is provided within sequencer 318 to track the completion of the multiple instructions, which are being executed within the execution units. Upon an indication that an instruction or a group of instructions have been completed successfully, in an application specified sequential order, completion buffer 348 may be utilized to initiate the transfer of the results of those completed instructions to the associated general-purpose registers.

The present invention provides an improved method, apparatus, and computer instructions for generating instructions to process multiple similar expressions, where similar means the instructions needed to execute the expressions are the same except for specific differences. Examples of acceptable differences are that operand addresses may refer to adjacent or nearly adjacent memory locations instead of to the same location; that literals or immediate operands may differ; or that the operations may differ slightly, such as one containing an add where another contains a subtract (as shown in the example in FIG. 11), or one containing an operation that another does not. The acceptable differences depend on the data processing system.

Parameters are identified for the expressions in the original instructions, to form a set of identified parameters typically including the operations performed, the types of data used, and the data sizes. Parameters also are identified for the data processing system on which the instructions will be executed, implying which execution units, associated register classes and instruction categories are available. In these examples, an instruction category refers to the various instructions such as load or add that can be executed by an execution unit or that can use a particular register class. Examples of instruction categories include those instructions operating on integers contained in general purpose registers, or memory-to-memory instructions. Instruction categories and register classes can be divided into conceptual subclasses (e.g., 4 bytes versus 8 bytes) even when the same hardware registers and functional units will be used. Instruction categories are sometimes referred to as execution units.

Each type of execution unit that can execute the instructions needed to process the expressions using the set of identified parameters is identified, wherein a set of identified execution unit types is formed. An execution unit type from the set of identified execution unit types is selected to meet a performance goal. The new instructions are generated for the selected execution unit type to process the expressions, and the original instructions for the expressions are discarded.

In processing expressions, various actions such as load and store operations may be needed to process these expressions.

In evaluating these actions, lists of load and/or store instructions loading from or storing into adjacent or nearly adjacent memory locations are constructed from the instructions. In these illustrative examples, each list should contain either loads or stores, not both, and the instructions in each list should be arranged in order by the address of the memory locations they use, and that ordering dictates the ordering of other instruction lists created later. These constructed instruction lists are then searched for groups of instructions that meet the desired criteria for load or store instructions. Starting with one of these lists (or of the lists of instructions which use the data they calculate or provide), all their expression trees are recursively examined in parallel. An expression tree is a conceptual representation of an expression to be calculated, which is explicitly or implicitly described in the data structures used by an optimizer. Criteria are evaluated and a list of acceptable kinds of registers and/or instruction categories is generated (treating memory-to-memory as a kind of pseudo-register).

Whenever the list becomes empty, the decision making used in the processes in these examples can be terminated immediately because no single kind of register and/or instruction category is acceptable. This situation implies that the original expressions use multiple register classes and/or instruction categories. Whenever the list is reduced to only one element, the decision making may be terminated immediately because no widening is possible, or it may be continued in case other improvements are possible. Otherwise, the entire expression is checked.

After the checking is performed, the register type to use (if any) and/or instruction category is chosen, then the expression trees are recursively processed again, generating new instructions for the chosen kind of register and/or instruction category and the instructions available for them.

Figure 4:
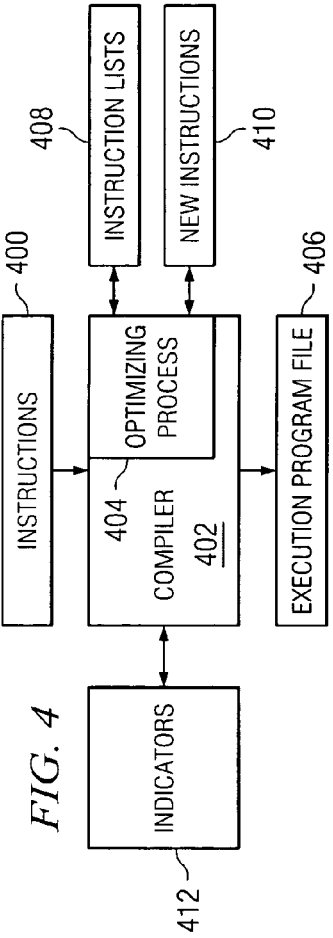
FIG. 4 is a diagram illustrating components used in improving instruction execution in accordance with an illustrative embodiment of the present invention.

With reference next to FIG. 4, a diagram illustrating components used in widening instructions is depicted in accordance with an illustrative embodiment of the present invention. In this illustrative example, instructions 400 are original instructions for a program or application. Compiler 402 processes instructions 400, transforms them in ways expected to improve performance or program size ("optimizes" them) and transforms them to the form required for the target computer to execute them, and sends these instructions to executable program file 406 for later processing. In translating instructions 400 into those in executable program file 406, compiler 402 uses an "optimizer", optimizer process 404. This component includes a variety of "optimizations" including those of the present invention to improve program execution for a target data processing system.

In this illustrative example, optimizing process 404 identifies expressions within process 400 that require processing. Optimizing process 404 generates instruction lists 408. These instruction lists contain load and store instructions used to perform operations needed to execute expressions. Instruction lists 408 are processed in a manner to identify execution unit types and/or instruction categories that meet an optimization goal.

After performing this processing, optimizing process 404 generates new instructions 410 to process the expression. New instructions 410 are then sent to executable program file 406 for later execution. This processing of instruction lists 408 may be performed in a number of different ways in accordance with an illustrative embodiment of the present invention.

For example, in processing instructions 400, optimizing process 404 declares a structure/array/set of indicators 412, such as boolean (true or false) flags or anything equivalent. Each of these flags is used to indicate whether a particular register class and/or instruction category is acceptable for processing an expression. In this example, a register class or instruction category is acceptable if that class or category can be used to give correct results with reasonable performance; for example, if floating point register pairs may be used. Optionally, indicators 412 include additional flags indicating whether each is desirable.

Each of the flags in indicators 412 are initialized to true or false, depending on different parameters. These parameters include, for example, the target architecture, execution mode, target model, target tuning, compiler options specified by the programmer, debug options, or any other relevant criteria. These parameters are used in identifying what execution unit types can be used to execute instructions for the expression.

Optimizing process 404 constructs lists of loads and stores involving adjacent or nearly adjacent memory in instruction lists 408. Typically, the compiler's representation of a load or store will include or imply the type of operation, how many bytes are involved, and some form of address such as a base register, zero or more index registers, and a displacement. One set of criteria for adjacency is that two instructions have the same base and index registers, and the larger of their displacements is equal to the smaller displacement plus the number of bytes the smaller one operates on. Some computers have load and store instructions able to access non-adjacent memory; for these computers the adjacency is optional as long as the base and index registers are the same so that a single load or store could be used. Adjacency is also optional for computers that can efficiently merge values from multiple sources, but in many cases it is necessary for efficiency.

Optionally, optimizing process 404 examines all of the loads in instruction lists 408 to see if these instructions produce results used by instructions other than the stores. For example, these load instructions may feed compares. If this situation is present, optimizing process 404 constructs lists of the consumers of adjacent or related loads, that is, that use their result, or that use the results of their consumers, and so on. For each list of adjacent or related stores or consumers, optimizing process 404 selects a subset that can be handled efficiently together (some of the criteria below (such as total width) or other criteria may optionally be used). In the illustrative examples, a subset is either the entire list or a shorter portion of the list.

Various criteria are present for evaluating these instructions used to process expressions and the criteria depend on the computer architecture on which the program will execute. Optionally, some of these criteria may be considered when the list is being constructed instead of when selecting subsets. Some typical examples of criteria include:

1. Generally a larger subset will be better than a smaller one (doing more in parallel) as long as the subset does not exceed the largest register size being considered. As a result, usually, the largest subset(s) up to that size should be tried first, then smaller ones.

2. The total width of the contiguous data must be less than or equal to the width of the kind of registers that might be chosen. Typical register sizes (depending on the architecture and what mode it is executing in) are 4 or 8 bytes for "general purpose" registers, 4 or 8 bytes for "floating point" registers, and 8 or 16 bytes for "vector" registers. It may be possible to use pairs or groups of registers of a particular kind. When memory-to-memory instructions are used, the length may be variable from 1 byte to some maximum size such as 256 bytes. A shorter data width may or may not be legal and practical; a longer width must be broken up.

3. The load and store instructions available for a kind of register or instruction category may have constraints or preferences. If the alignment of the memory address is inappropriate for the kind of register and the instruction used, loading or storing it might cause the program to fail, might produce incorrect results, or might be slower or much slower. Loading or storing a register with inappropriate instructions might corrupt the data or produce unwanted exceptions or traps. The other operations needing to be performed on the data may be valid in multiple kinds of registers, or may only be valid in one or some kinds, depending on the computer architecture. Examples: An integer multiply may be valid in general purpose or vector registers but not in floating point registers or memory-to-memory. A floating point operation may be valid only in floating point or vector registers. A bitwise operation (e.g., AND) may be valid only in general purpose registers or memory-to-memory.

4. The instructions available for use with each kind of register may only accept data of some widths; for example, a 4-byte integer add may be valid in either general purpose or vector registers while an 8-byte integer add must only be done or is more efficient in general purpose registers but a 2-byte add is only practical in vector registers. A double precision floating point subtract might only be valid in floating point registers while a single precision one or a double precision negate might also be valid in vector registers.

5. The narrow operations to be widened may need to be identical for all the data, but using the right register classes and/or instruction categories it may be possible to simultaneously do different operations or apply some operations to only some of the values; for example, adding some values while subtracting others, or negating some values while leaving others unchanged.

6. The loads, stores, and operations often have different costs depending on the kind of register and/or instruction category used, what is known about the memory alignment, what the actual alignment is, and other factors.

7. Transferring data between different kinds of registers may be expensive. If the input data is produced or the output data is needed in a particular kind of register or in memory, it may be better to use a locally suboptimal code sequence than to transfer between kinds of registers.

After examining the load, store or other consumer instructions, optimizing process 404 may reject these expressions as not improvable. Otherwise it resets the flags in indicators 412 to their initial values, where a true means a register class or instruction category could be used and a false means it cannot.

Optimizing process 404 then examines each of the instructions in the selected adjacent subset and applies all relevant criteria, including that the operations and their inputs are identical or compatible. Different sets of criteria will be relevant for loads, for stores, and for other operations.

Each criterion that passes leaves the flags for those criterion unchanged. Optimizing process 404 sets the appropriate flags to false for each criterion that fails. For example, depending on the total width or on which register class an operation is available for, some flags may be set to false and others unchanged. At this or any subsequent point, if all the "acceptable" flags are false or only the flag for the original register class and/or instruction category is true, to minimize compile time checking this subset may be terminated immediately, or for simplicity it may continue.

For each input operand which may vary between instructions in the list and is not in one of the original lists, optimizing process 404 constructs a list of the instructions producing that operand in each of the list of instructions. These lists are used by optimizing process 404 to analyze the expressions, and will not be part of the new instructions.

Optimizing process 404 then recursively applies the above described steps starting with the step in which each of the instructions in the selected adjacent subset is examined to construct each of the new lists.

The input operands to a list of instructions may be a subset of a list of adjacent loads. They may also not be locally visible (e.g., function parameters received from a caller). Either of these cases acts as the leaves of the parallel expression trees and terminates the recursion on that path.

When the recursive checking is complete, optimizing process 404 examines the "acceptable" register class and/or instruction category flags. There are three possibilities: no flags are true, more than one flag is true, or only one flag is true. When no flags are true, no single register class and/or instruction category is acceptable. It may be possible to evaluate different parts of these expression trees in different classes of registers, but the simple approach is to abandon that subset.

An example of when more than one flag is true is when the values are just being copied, and their total width is compatible with multiple classes of registers. That means a choice must be made which register class to use. Various criteria can be used for that choice; examples include the class of registers originally used, the "preferred" register class flags, estimates of the register pressure (how many values must be simultaneously held) for each register class, or the probability of a misaligned load or store crossing an important boundary such as a cache line. Another optional technique is to calculate or estimate various costs (minimum, maximum and probable execution time, and code size) for each possible class of register and/or instruction category while checking what kinds are acceptable.

If only one flag is true, the corresponding register class and/or instruction category should be used.

Optimizing process 404 then recursively walks the parallel expression trees again, this time generating code using the chosen kind of register and/or instruction category. The code is generated from the leaves up, with each instruction generated producing a result register (or result registers) for its consumer to use as an input operand (memory-to-memory instructions produce a result address description not just a register).

In one illustrative embodiment, if optimizer process 404 has knowledge which of the original narrow instructions produced results for other non-widened instructions, by static single assignment form, by definition/use chains, by reaching information, by "dead bits", or by other means, then as expressions are widened the original narrow instructions that are no longer needed can be deleted.

In another illustrative embodiment, most of the original narrow instructions may be left in, with just the stores or other final (root) consumers deleted. Then a standard optimization technique such as redundant code elimination may be used to delete the unneeded instructions because deleting the stores or consumers means that their results are not used. Instructions whose results are still needed will automatically be retained. This may lead to some redundancy but that is uncommon and in some cases it is more efficient than alternatives.

In a third illustrative embodiment, the new instructions can be inserted before or after the original ones in a way that later optimizations can determine that the originals are redundant and delete them.

An optional extension is that if any narrow values are needed for other instructions, new instructions can be generated that extract each narrow value from the widened vector.

If transfers between different kinds of registers are expensive, this option may only be practical if the values are needed in the same kind of register in which the widened set of values is produced.

If it is unknown whether or not a value is needed, the instructions can be generated speculatively and removed later if not needed.

FIGS. 5-11 are examples of expressions containing instructions, the generation of trees from the instructions, and resulting trees for using in generating new instructions in accordance with an illustrative embodiment of the present invention. In these illustrative examples in FIGS. 5-11, two mechanisms are used to temporarily organize the information about the instructions and expressions, expression trees and instruction lists. These trees and lists track different information about the same instructions. Trees relate producers to consumers, while lists relate related loads, related stores, or their producers and consumers.

FIG. 5 is a diagram illustrating a selection of register classes for executing instructions in accordance with a preferred embodiment of the present invention. Code 500 contains an expression to be evaluated. In processing code 500, flags for execution units are declared. In these examples, the flags include: GPRs_OK, FPRs_OK, FPR_Pairs_OK, VRs_OK, and Memory_OK, each indicating whether the corresponding register class can be used.

In this example, code 500 is targeted for execution on a PowerPC processor, PPC 970. This processor is available from International Business Machines Corporation. The flags are then set as follows: GPRs_OK=true, FPRs_OK=true, FPR_Pairs_OK=false, VRs_OK=true and Memory_OK=false. Thereafter, a list of stores involving adjacent memory is constructed as follows: store a[0], store a[1], store a[2], store a[3], and store a[4]. The only list of adjacent stores is: store a[0], store a[1], store a[2], store a[3], store a[4]. In this example, each store forms the root node of a tree.

As can be seen in FIG. 5, trees 502, 504, 506, 508 and 509 are generated for each of the stores. Tree 502 contains the store instruction as root node 510. The other operations leading up to the store form nodes 512, 514, 516, 518, and 520. Tree 504 contains root node 522 along with nodes 524, 526, 528, 530, and 532. Similarly, tree 506 contains root node 534 along with nodes 536, 538, 540, 542, and 544. Tree 508 contains root node 546 along with nodes 548, 550, 552, 554, and 556. In the same manner, tree 509 contains root node 558 along with nodes 560, 562, 564, 566, and 568. The nodes at the other end from a root node are also called leaf nodes. The nodes in between are referred to as non-leaf nodes or branch nodes.

A subset of the list equal to the entire list is picked from store a[0], store a[1], store a[2], store a[3], store a[4]. In these examples, the process of the present invention may start with the entire list, rather than a shorter adjacent list, depending on the particular implementation.

Criteria are then applied to the selected subset. In these illustrative examples, the subset criteria include the following: (1) For GPRs, total length of subset must be 4 or 8. Length is 5×4=20, so GPRs_OK=false; (2) For FPRs, total length of subset must be 4 or 8. Length is 5×4=20, so FPRs_OK=false; and (3) For VRs, total length of subset must be 16. Length is 5×4=20, so VRs_OK=false. In this case, since all flags are false, the subset is rejected.

Next, a new subset is selected for processing. An easy and efficient approach is to begin with the largest practical subset then at each step choose a new subset either by removing the first instruction, or removing the last instruction, or picking a subset of the same length but shifted left or right by one instruction.

One heuristic is to remove the last store from the previous subset, giving: store a[0], store a[1], store a[2], store a[3]. The criteria are then applied to the subset. In this example, some of the criteria are: (1) For GPRs, total length of subset must be 4 or 8. Length is 4×4=16, so GPRs_OK=false. (2) For FPRs, total length of subset must be 4 or 8. Length is 4×4=16, so FPRs_OK=false. (3) For VRs, total length of subset must be 16. Length is 4×4=16, so VRs_OK=true. In this case, at least one flag is true. The process continues to check the subset.

Next, all of the flags are set as follows: GPRs_OK=true, FPRs_OK=true, FPR_Pairs_OK=false, VRs_OK=true, Memory_OK=false.

Then, the instructions in the list are examined. In these illustrative examples, the instructions are examined sequentially. The instructions in the list include store a[0], store a[1], store a[2], store a[3], store a[4] with the flags being updated. These flags are updated based on an application or criteria for the instructions being applied to the instructions. These instructions are found in trees 502, 504, 506, 508, and 509 in these examples.

In examining the instructions, a first instruction from the list is selected. This list is a separate data structure from the trees in these examples. The first instruction is store a[0]. "Store" instruction criteria are applied to this instruction. In this example, one store criteria is that for VRs, the address must be a multiple of 16. Assuming the address of array a is a multiple of 16, the address of a[0] also is a multiple of 16. Thus, the criteron is met and VRs_OK is unchanged with the flag still being set to true. This flag indicates that VRs are a viable register class for use in processing the instruction.

Then, a list of input operands which vary between list entries is constructed. This list is constructed using the list of stores and trees 502, 504, 506, 508 and 509. Each of the store instructions in the list is examined and its input operand identified, and using the trees a list is made of the instructions producing those operands. In this example the operands are a result of [0] float add 512, result of [1] float add 524, result of [2] float add 536, result of [3] float add 548 and a list of those instructions is made.

The instructions in this list are examined. The examination is part of a recursive process used to examine lists of instructions. This list is the list constructed from the trees (result of [0 . . . 3] float add), updating flags.

The process selects the first instruction in the list, which is [0] float add in this example. Next, "float add" instruction criteria are applied to this instruction. The only criterion in this example is that the instruction is not valid for GPRs. In this case the flag GPRs_OK is set equal to false. This flag was originally set to false because the length is 16 but an additional reason has been found.

Then, the process selects the next instruction in the list, which is [1] float add, and processes this instruction in a similar fashion. The same process is applied to the other instructions in the list, [2] float add and then [3] float add. It is also necessary to check that all instructions in the list are the same operation or compatible operations; if they are the same, their criteria are normally identical and need not be reevaluated.

After the instructions have been processed, lists of input operands which vary between list entries are constructed. These lists of input operands are constructed using trees 502, 504, 506, 508, and 509. In this example, the lists are as follows: list 1: result of [0] float multiply 514, result of [1]

float multiply 526, result of [2] float multiply 538, result of [3] float multiply 550; and list 2: load c[0] 516, load c[1] 528, load c[2] 540, load c[3] 552.

The instructions in list 1 are examined (result of [0] float multiply, result of [1] float multiply, result of [2] float multiply, result of [3] float multiply) with the flags being updated. This examination includes selecting a first instruction, float multiply [0], for processing. "Float multiply" instruction criteria are applied to this instruction. In this example, one float multiply criterion is that it is not valid for GPRs. As a result, GPRs_OK is set equal to false. In this case, the flag was already set to false. The subsequent instructions [1] float multiply, [2] float multiply and [3] float multiply are processed in a similar fashion.

Thereafter, lists of input operands which vary between list entries are constructed using trees 502, 504, 506, 508 and 509. The lists in this illustrative example are: list 1: load b[0] 518, load b[1] 530, load b[2] 542, load b[3] 554 and list 2: load 2.0f 520, load of 2.0f 532, load of 2.0f 544, load of 2.0f 556.

The instructions in the list are examined as part of a recursive process (list 1: load b[0], load b[1], load b[2], load b[3]) and flags are updated. This process includes selecting the first instruction, load b[0]. "Load" instruction criteria are applied to this instruction to see which register classes may be used. In this example, some of the criteria are: (1) For GPRs, operand length must be 4 or 8. Length is 16, so GPRs_OK is set to false again; (2) For FPRs, operand length must be 4 or 8. Length is 16, so FPRs_OK is set to false again; and (3) For VRs, operand length must be 16. Length is 16, so VRs_OK is unchanged (still true). The same process is applied to other load instructions in the list, load b[1], load b[2], and load b[3]. In this example, the process continues checking the subset because at least one flag is true.

Lists of input operands which vary between list entries are constructed from trees 502, 504, 506, 508 and 509. None are present in the examples, except the addresses. Since the instructions are loads, the examination of the instructions is done. Because more input operand lists are present, the next list, list 2, is selected for processing. The instructions in list 2 are examined. The instructions are load 2.0f, load of 2.0f, load of 2.0f, and load of 2.0f. The flags are updated in response to examining these instructions.

This process begins by selecting the first instruction in the list, which is load 2.0f. "Load" instruction criteria are applied to this instruction. In this illustrative example, some of the criteria include: (1) For GPRs, operand length must be 4 or 8. Length is 16, so GPRs_OK is set to false again; (2) For FPRs, operand length must be 4 or 8. Length is 16, so FPRs_OK is set to false again; (3) For VRs, operand length must be 16. Length is 16, so VRs_OK is unchanged (still true). This process is repeated with the other instructions in list 2. In this example, since at least one flag is true, the process continues to check the subset.

Lists of input operands, which vary between list entries, are constructed from trees 502, 504, 506, 508 and 509. In this example no such operands are present. Since the instructions are loads, their examination is done. Also, no more input operand lists are present. Thus, the examination of the float multiplies is done.

Next, the process examines instructions in list 2 from the float adds, which includes load c[0], load c[1], load c[2], and load c[3]). Again as described above, this examination is part of a recursive process. The flags are updated based on this examination of the instructions.

The first instruction, load c[0], is selected for processing. "Load" instruction criteria are applied to this first instruction. In this illustrative example, some of the criteria are: (1) for GPRs, operand length must be 4 or 8. Length is 16, so GPRs_OK is set to false; (2) For FPRs, operand length must be 4 or 8. Length is 16, so FPRs_OK is set to false; and (3) For VRs, operand length must be 16. Length is 16, so VRS_OK is unchanged (still true).

Since at least one flag is true, the process continues checking the subset. Examination of the float adds is complete because no more input operand lists are present. Also, since no more input operand lists are present, examination of the stores is complete.

Afterwards, the flags are examined. In this case, only VRs_OK is true and the other flags are false. With a flag being true, examination of other subsets is unnecessary. VRs is chosen as the register class.

With a selected register class, the process recursively walks the instruction trees in parallel, rewriting to use Vector Registers. The original store instructions are then deleted. Later dead code elimination processes are employed to delete the other instructions if they are redundant.

Figure 6:
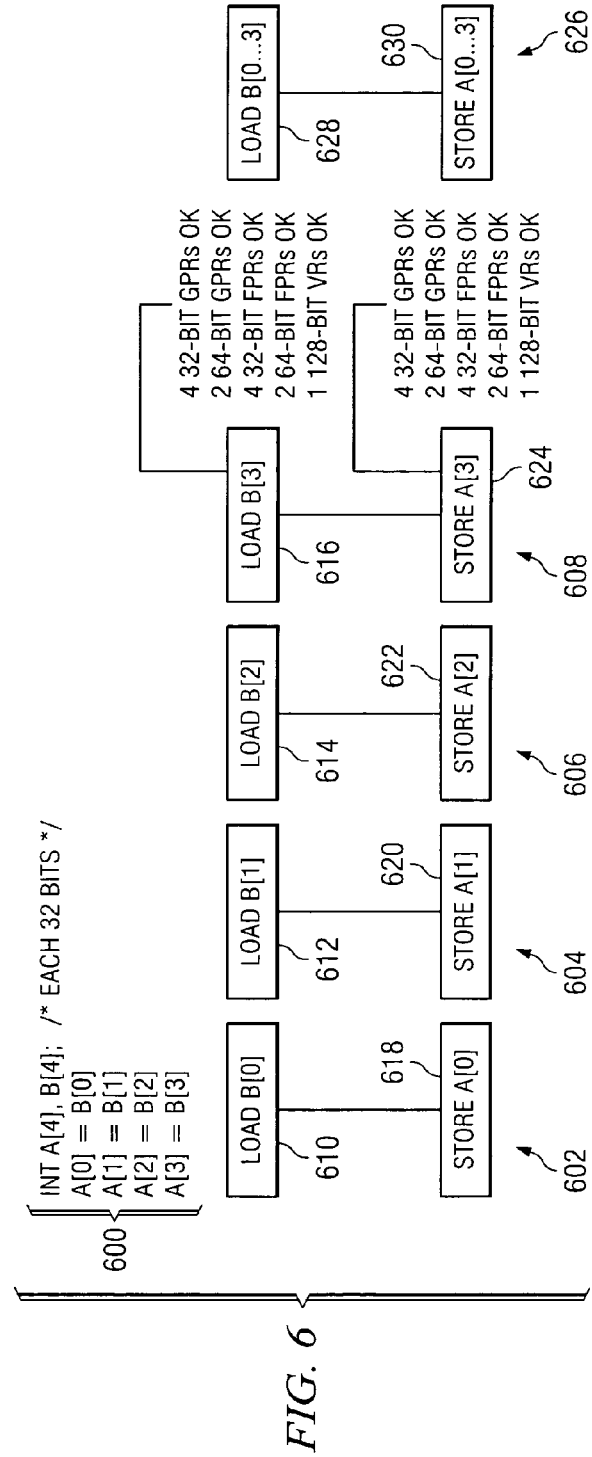

In FIG. 6, code 600 is a set of instructions generated to process or evaluate an expression. Trees 602, 604, 606 and 608 are generated for these instructions. Nodes 610, 612, 614, and 616 are leaf nodes, while nodes 618, 620, 622, and 624 are root nodes. The list of loads in this example is nodes 610, 612, 614 and 616. The list of stores is nodes 618, 620, 622 and 624.

In this illustrative example, the target processor is a PowerPC processor with optional VMX instructions and registers. PowerPC processors are available from International Business Machines Corporation. The Vector Multimedia extension instructions available on some PowerPC processors, for example, the PowerPC 970, are designed to execute instructions operating on short vectors including operations useful in multimedia audio and video applications. Similar capabilities are available on some other processors.

In evaluating code 600 using the mechanism of the present invention in these examples, code 600 only contains operations in the form of loads and stores. Array alignments are assumed to be acceptable for any of the register classes. Also the use of multiple loads is assumed to be allowed. A total length of 4×32=128 bits is acceptable for any of the register classes. Additionally, the operation "load" is available for any register class, and operation "store" is available for any register class.

In this example, no register class is rejected when examining the instruction lists. As a result, any of the register classes: general purpose registers (GPRs), floating point registers (FPRs), or vector registers (VRs) is acceptable for processing code 600. Using the fewest instructions (hence the largest registers) is generally also fastest.

The mechanism of the present invention concludes that one vector load and one vector store is best. Thus, tree 626 containing nodes 628 and 630 is generated to process the expression. This tree is used to generate the new instructions that will later be executed when the program is run.

Figure 7:
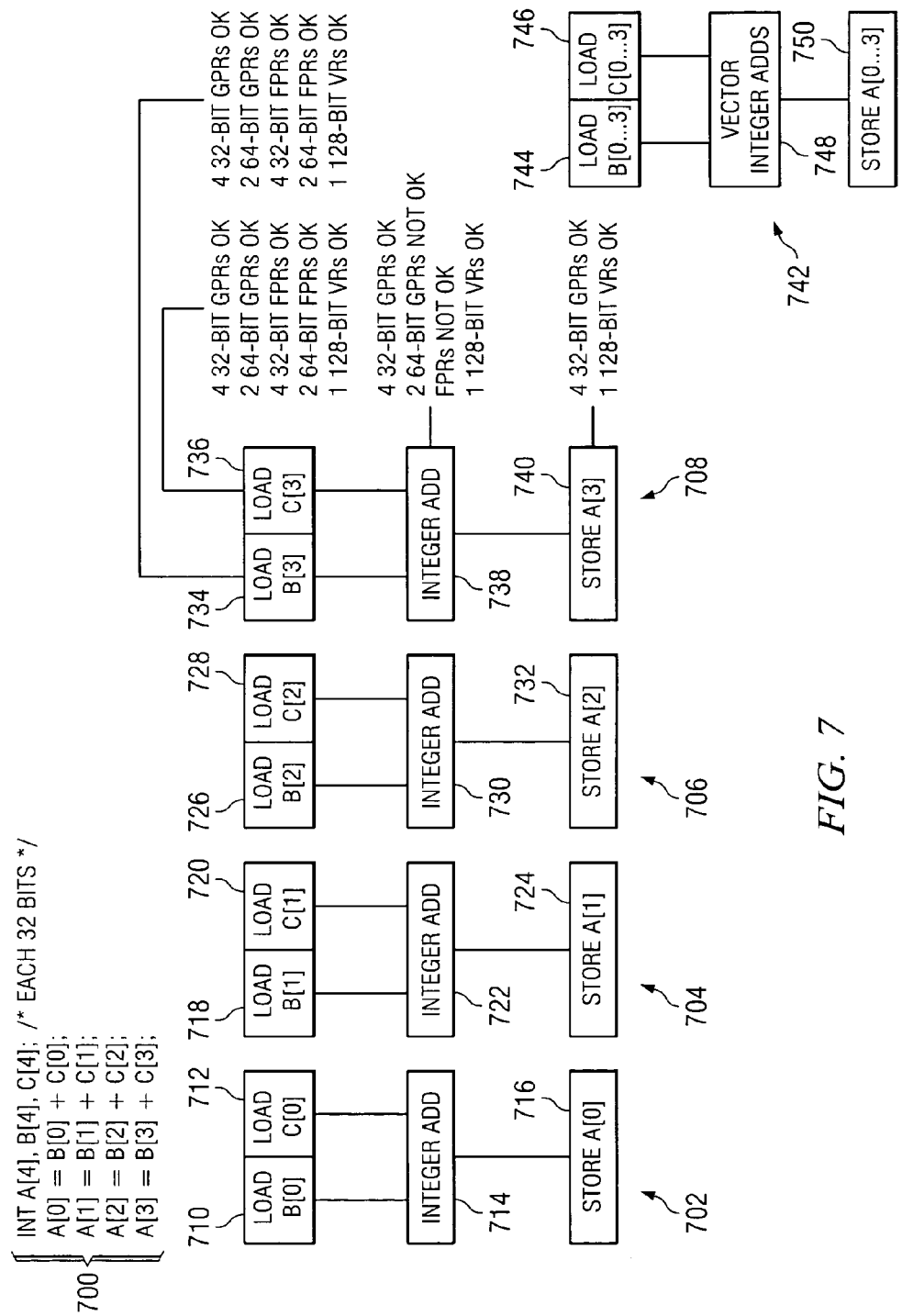

With reference to FIG. 7, code 700 is a set of instructions generated to process or evaluate an expression. In this example, trees 702, 704, 706, and 708 are generated from code 700 for evaluation using the mechanism of the present invention. In this example, tree 702 contains leaf nodes 710 and 712, inner node 714 and root node 716. Tree 704 contains leaf nodes 718 and 720, inner node 722 and root node 724. Similarly, tree 706 contains leaf nodes 726 and 728, inner node 730 and root node 732. Tree 708 contains leaf nodes 734 and 736, inner node 738 and root node 740.

In FIG. 7, the first list of loads is nodes 710, 718, 726 and 734. The second list of loads is nodes 712, 720, 728 and 736.

Two lists are used in these examples because two separate areas in memory are being loaded—the "b" array and the "c" array. The list of stores is nodes 716, 724, 732 and 740. When that list is being examined, the list of nodes 714, 722, 730 and 738 containing input operands of the instructions in the store list is created and used. When this list is being examined, the lists of the adds' input operands will be created and used, or if previously created then just used. The list for the left/first operand of the adds contains nodes 710, 718, 726 and 734. The list for the right/second operand contains nodes 712, 720, 728 and 736.

In this illustrative example, the target processor is a PowerPC processor with optional VMX instructions and registers. The only operations present in code 700 are loads, integer adds, and stores. In evaluating the trees, in this example array alignments are acceptable for any of the register classes. The total length of 4×32=128 bits is acceptable for any of the register classes. Operation "load" is available for any register class. Operation "store" is available for any register class.

In this example, the FPR class is rejected when examining the list of integer adds. So either of the register classes GPRs and VRs is acceptable for use in executing instructions. Using the mechanism of the present invention, a conclusion is made that two vector loads, one vector integer add and one vector store are best, as shown in tree 742 which contains leaf nodes 744 and 746, inner node 748 and root node 750.

Figure 8:
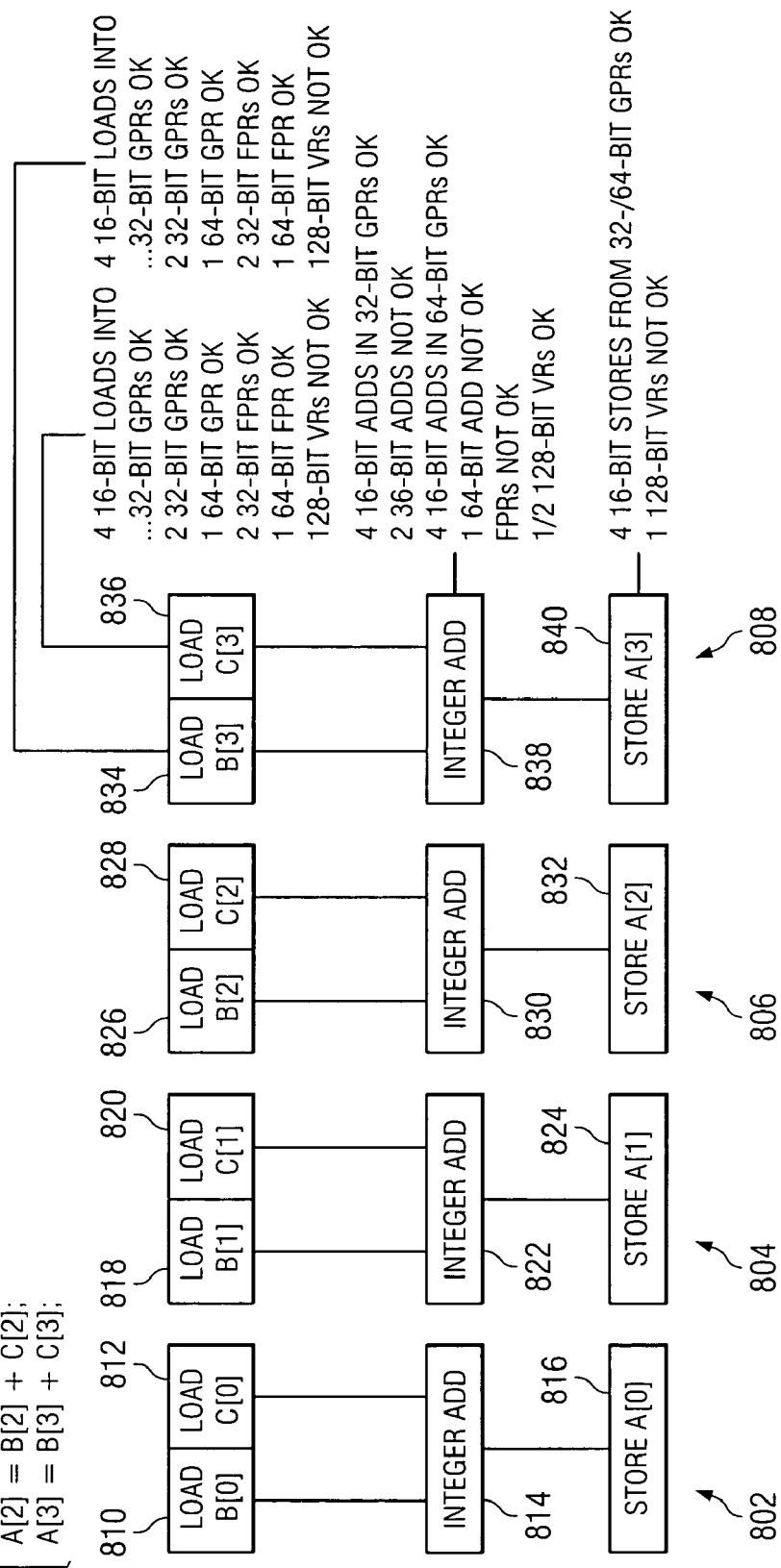

Next in FIG. 8, code 800 is used to generate trees 802, 804, 806, and 808. These trees are used by the mechanism of the present invention to identify the best register class to use in executing the instructions in code 800. In this example, trees 802, 804, 806, and 808 are generated from code 800 for evaluation using the mechanism of the present invention. In this example, tree 802 contains leaf nodes 810 and 812, inner node 814 and root node 816. Tree 804 contains leaf nodes 818 and 820, inner node 822 and root node 824. Similarly, tree 806 contains leaf nodes 826 and 828, inner node 830 and root node 832. Tree 808 contains leaf nodes 834 and 836, inner node 838 and root node 840.

In this illustrative example, the target processor is a PowerPC processor with optional VMX instructions and registers. The only operations present in code 800 are short loads, integer adds, and short stores. Array alignments are assumed to be acceptable for any of the register classes. The total length of 4×16=64 bits is acceptable for most of the register classes in this example, but not (efficiently) for vector register loads and stores. In processing the trees using the mechanism of the preset invention, the operation "load" of this size is available for any register class except VRs, and operation "integer add" is available only for GPR and VR register classes. Additionally, the operation "store" of this size is available for any register class except VRs.

In this example, the VR class is rejected when examining the lists of loads and the list of stores, and the FPR class is rejected when examining the list of integer adds. As a result, the only usable register class is the one for GPRs, and the original set of instructions for these expressions cannot be improved in this example.

Vector Registers could be used with some loss of efficiency by also loading whatever is in the memory following b[3] and c[3], and using additional instructions to load whatever follows a[3], then merging that with the a[0 . . . 3] results before the store or re-storing it after the vector store. That possibility can be determined by the present invention by a different choice of acceptability criteria for loads and stores than assumed in this example. The additional instructions may make it less efficient than the original. It would also be necessary to prove that loading and storing the additional memory would be safe that it would not cause errors or change other computations.

Figure 9:
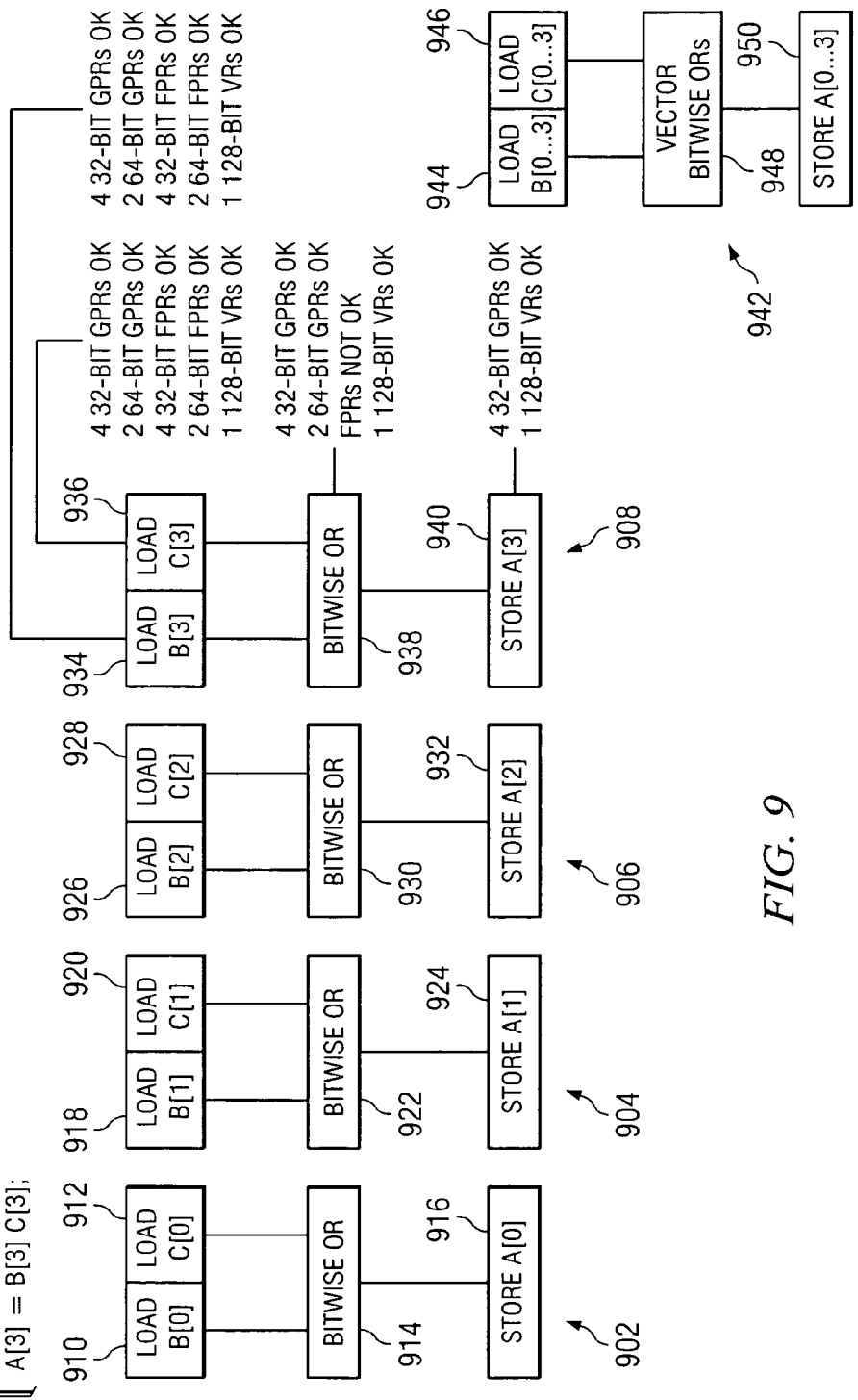

In FIG. 9, code 900 is used to generate trees 902, 904, 906, and 908. These trees are used by the mechanism of the present invention to identify the best register class to use in executing the instructions in code 900. In this example, trees 902, 904, 906, and 908 are generated from code 900 for evaluation using the mechanism of the present invention. In this example, tree 902 contains leaf nodes 910 and 912, inner node 914 and root node 916. Tree 904 contains leaf nodes 918 and 920, inner node 922 and root node 924. Similarly, tree 906 contains leaf nodes 926 and 928, inner node 930 and root node 932. Tree 908 contains leaf nodes 934 and 936, inner node 938 and root node 940.

In this illustrative example, the target processor is a PowerPC processor with optional VMX instructions and registers. The only operations present in code 900 are loads, bitwise ORs, and stores. Array alignments are assumed to be acceptable for any of the register classes. The total length of 4×32=128 bits is acceptable for any of the register classes. In evaluating the trees using the mechanism of the present invention, the operation "load" is available for any register class; the operation "bitwise OR" is available only for GPR and VR register classes; and the operation "store" is available for any register class.

In this example, the FPR class is rejected when examining the list of bitwise ORs. As a result, either of the register classes, GPRs or VRs is acceptable for use in executing the instructions. Using the mechanism of the present invention, two vector loads, one vector bitwise OR and one vector store are found to be best for use in executing the instructions. Four 64-bit GPR loads, 2 bitwise ORs and two 64-bit GPR stores are found to be second best. As a result, tree 942 is generated for use in creating a new set of instructions to use the selected register class. Tree 942 contains leaf nodes 944 and 946, inner node 948 and root node 950.

If the target processor is an Intel IA-64, FPR bitwise ORs are available, so the acceptability criteria for bitwise OR instructions should not reject FPRs. The mechanism would decide that FPRs would be as good as GPRs. Intel IA-64 processors are available from Intel Corporation.

Figure 10:
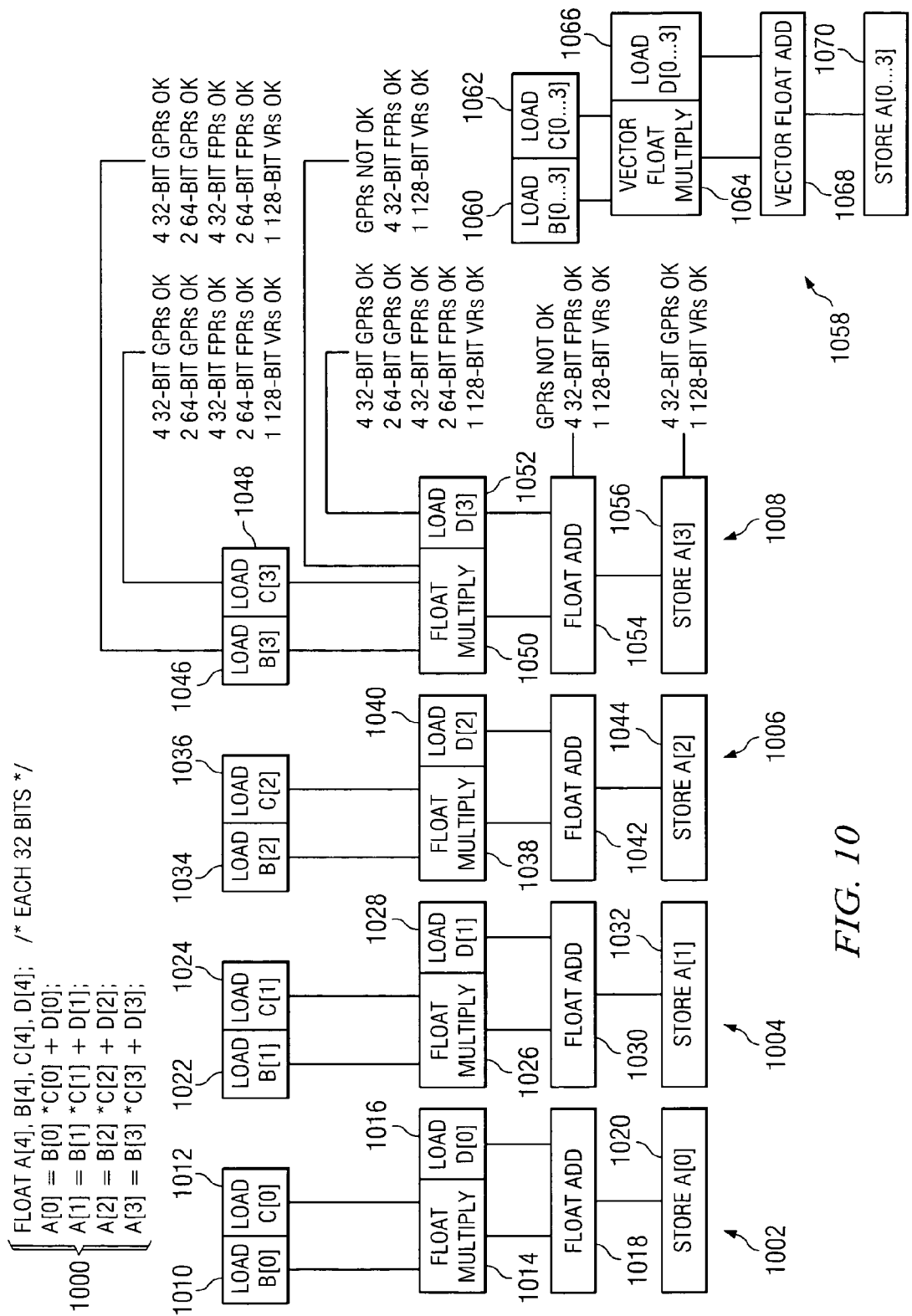

In FIG. 10, code 1000 is used to generate trees 1002, 1004, 1006, and 1008. Tree 1002 contains leaf nodes 1010, 1012, and 1016, inner nodes 1014 and 1018 and root node 1020. Tree 1004 contains leaf nodes 1022, 1024, and 1028, inner nodes 1026 and 1030 and root node 1032. Tree 1006 contains leaf nodes 1034, 1036, and 1040, inner nodes 1038 and 1042 and root node 1044. Tree 1008 contains leaf nodes 1046, 1048, and 1052, inner nodes 1050 and 1054 and root node 1056.

In this illustrative example, the target processor is a PowerPC processor with optional VMX instructions and registers. The only operations present in code 1000 are loads, float multiplies, float adds, and stores. Array alignments are assumed to be acceptable for any of the register classes. The total length of 4×32=128 bits is acceptable for any of the register classes. In evaluating the trees created from code 1000 using the mechanism of the present invention, the operation "load" is available for any register class; the operation "float multiply" is available only for FPR and VR register classes; the operation "float add" is available only for FPR and VR register classes; and the operation "store" is available for any register class.

In this example, the GPR class is rejected when examining the list of float multiplies and also when examining the list of float adds. As a result, either of the register classes FPRs or VRs is acceptable. In this illustrative example, the mechanism of the present invention determines that the instructions in code 1000 may be best executed using 3 vector loads, a vector float multiply, a vector float add, and a vector store. Thereafter, tree 1058 is generated for creating new instructions using the selected register class. Tree 1058 contains leaf nodes 1060, 1062, and 1066, inner nodes 1064 and 1068 and root node 1070.

If the target processor is an Intel IA-64, which can process 2 floats in parallel in a single FPR, but does not have VMX vector registers, then an additional register class or instruction category "parallel FPR" should be considered and the acceptability criteria for float multiply and float add should not reject the parallel FPR register class/instruction category. Then 6 FPR loads, 2 parallel float multiplies, 2 parallel float adds and 2 stores are best.

Figure 11:
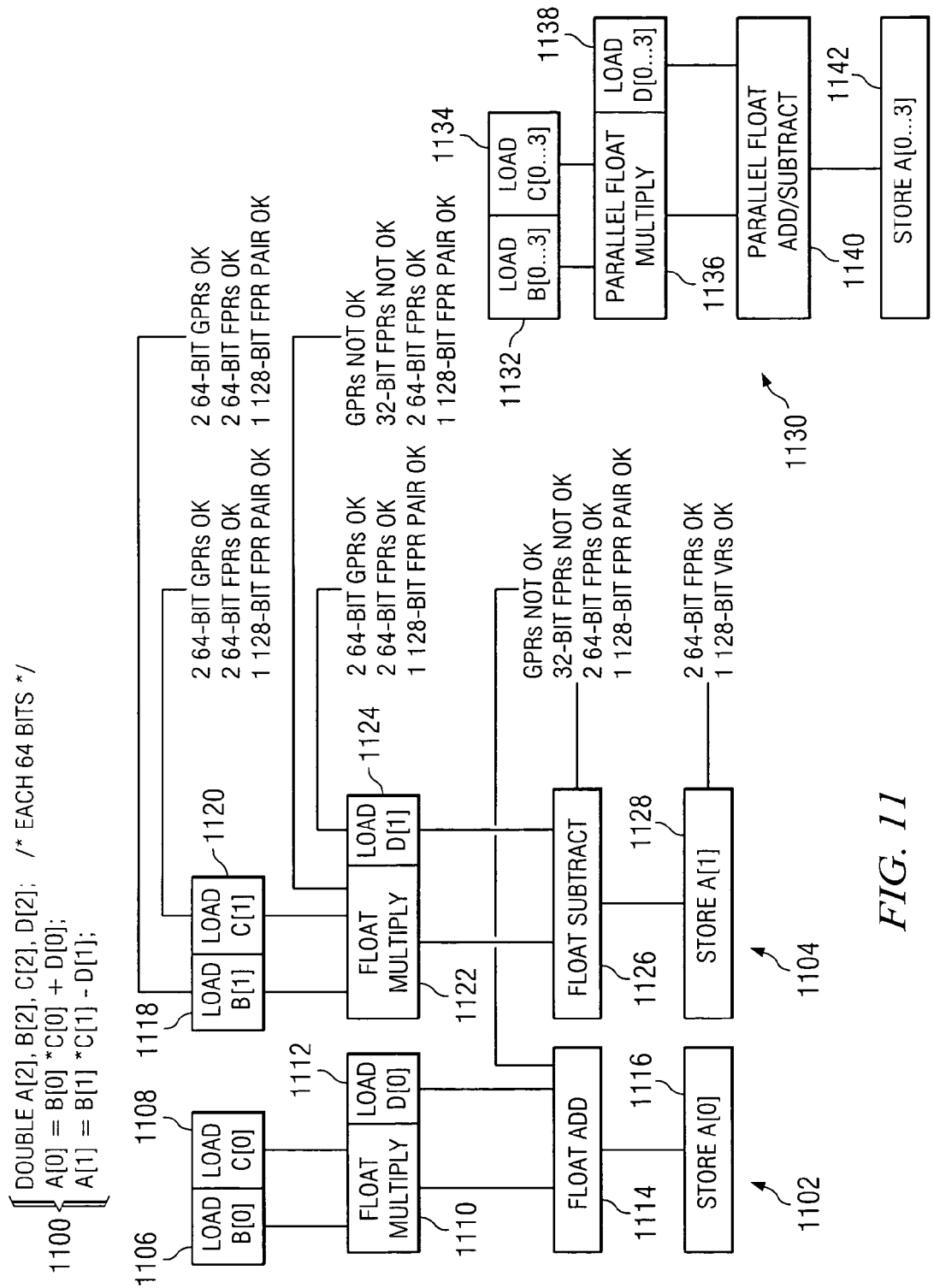

In FIG. 11, code 1100 is used to generate trees 1102 and 1104. As illustrated, tree 1102 contains leaf nodes 1106, 1108 and 1112, inner nodes 1110 and 1114 and root node 1116. Tree 1104 contains leaf nodes 1118, 1120 and 1124, inner nodes 1122 and 1126 and root node 1128.

In this illustrative example, the target processor is a PowerPC 440D processor with parallel FPR instructions operating on primary/secondary FPR register pairs. The only operations present in code 1100 are loads, float multiplies, float adds, float subtracts and stores. In evaluating the trees created from code 1100, array alignments are assumed to be acceptable for any of the register classes. The total length of 2×64=128 bits is acceptable for GPR, FPR or FPR pair classes.

In evaluating the trees using the mechanism of the present invention, the operation "load" is available for any register class; the operation "float multiply" is available for FPR and FPR pair register classes; the operations "float add" and "float subtract" are available only for FPR and FPR pair register classes; and the operation "store" is available for any register class. The trees are similar but do not contain identical operations, with node 1114 being a float add while node 1126 is a float subtract; however, the PowerPC 440D FPR pair register class/instruction group includes a "float add and subtract pair" instruction to add two primary registers while subtracting the corresponding secondary registers.

The VR register class does not exist on a PowerPC 440D so the VR class is rejected in the beginning. The GPR register class is rejected when examining the list of float multiplies and rejected again when examining the list of a float add and a float subtract. As a result, either of the register classes FPRs or FPR pairs is acceptable.

The mechanism of the present invention determines that three parallel loads, a parallel float multiply, a parallel add and subtract, and a parallel store is best for code 1100 in this illustrative example. Tree 1130 is then generated for use in creating new instructions using the selected register class. Tree 1130 contains leaf nodes 1132, 1134 and 1138, inner nodes 1136 and 1140 and root node 1142.

Figure 12:
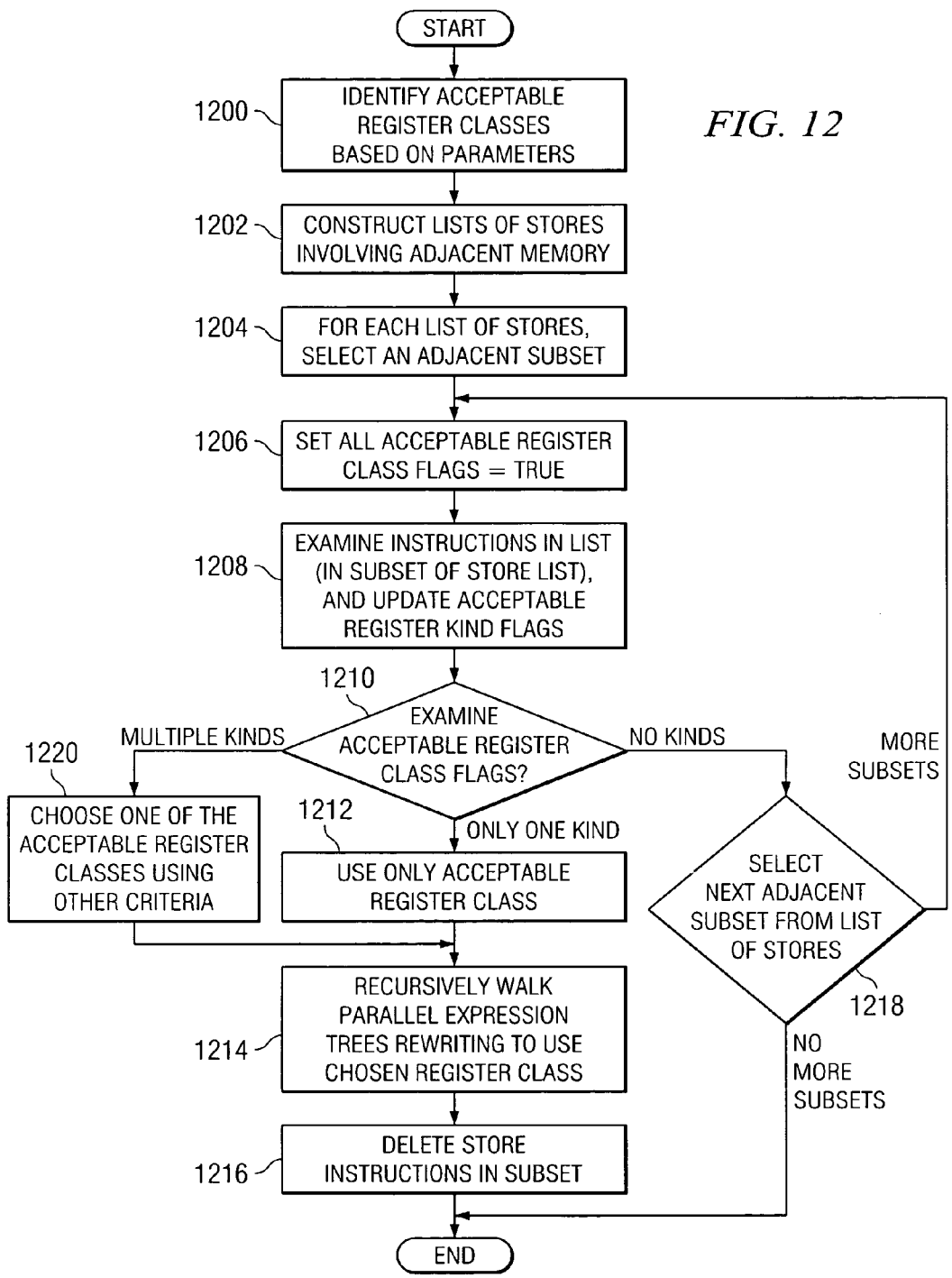
FIG. 12 is a flowchart of a process for selecting register classes for expressions in accordance with the preferred embodiment of the present invention.

Turning now to FIG. 12, a flowchart of a process for selecting register classes for expressions is depicted in accordance with the preferred embodiment of the present invention. The process illustrated in FIG. 12 may be implemented in an optimizing process, such as optimizing process 404 in FIG. 4. This flowchart is a simplified example omitting some optional steps described above.

The process begins by identifying acceptable register classes based on parameters, such as processor architecture and options (step 1200). A list of stores involving adjacent or related memory (using the same base and index address registers) is constructed (step 1202). For each list of stores an adjacent or almost adjacent subset is selected (step 1204). In this example, a subset is either the complete list or just part of the list. If the complete list obviously cannot be efficiently handled together, the process should start with a part of it that possibly can be, based on criteria such as address alignment and total length. All acceptable register class flags identified in step 1200 are set to equal true (step 1206). The instructions in the selected subset of the list are examined and the acceptable register class flags are updated (step 1208, described in more detail in FIGS. 13A and 13B). This updating of flags may include changing a flag from true to false. An examination of all acceptable register class flags is made (step 1210).

If only one kind of acceptable register class flag is present, the only acceptable register class is used (step 1212). With reference again to step 1210, if multiple kinds of acceptable register class flags are present, one of the acceptable register classes is chosen using other criteria as described above in the illustrative examples (step 1220). In both cases, the process then proceeds to step 1214.

The process recursively walks parallel expression trees rewriting to use the chosen register class (step 1214). In step 1214 the instructions in the trees are rewritten to use the register class selected in step 1212 or step 1220. The store instructions in the subset are deleted (step 1216), with the process terminating thereafter.

Turning back to step 1210, if no types of acceptable register class flags are present, the next subset is selected from the list of stores (step 1218), with the process returning to step 1206 to set all acceptable register class flags to equal true. Various mechanisms may be used to choose the next subset. The simplest mechanism that meets the requirements is to create two subsets, one by removing the first store from the current list, the other by removing the last store, and choosing those in either order. A list of subsets may be created in advance, or may be constructed one at a time as needed. If no more subsets involving more than one expression tree are present, the process ends.

The process illustrated in FIG. 12 examines subsets repeatedly, rejecting those subsets impossible to use until a usable subset is found. Possibly subsets may be usable with only one being selected.

Figure 13A:
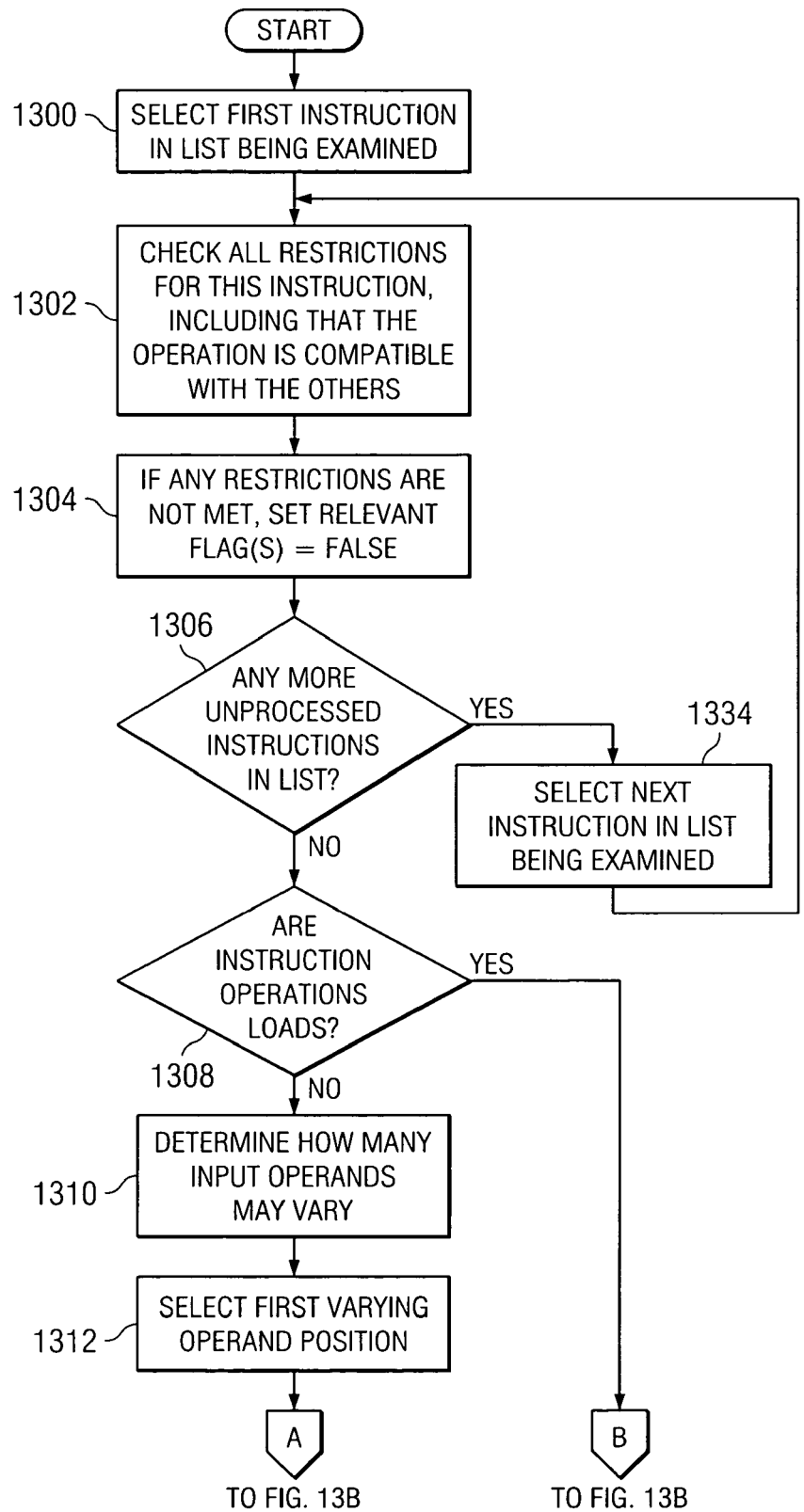
FIGS. 13A and 13B are a flowchart of a process for examining instructions in a list in accordance with the preferred embodiment of the present invention.
Figure 13B:
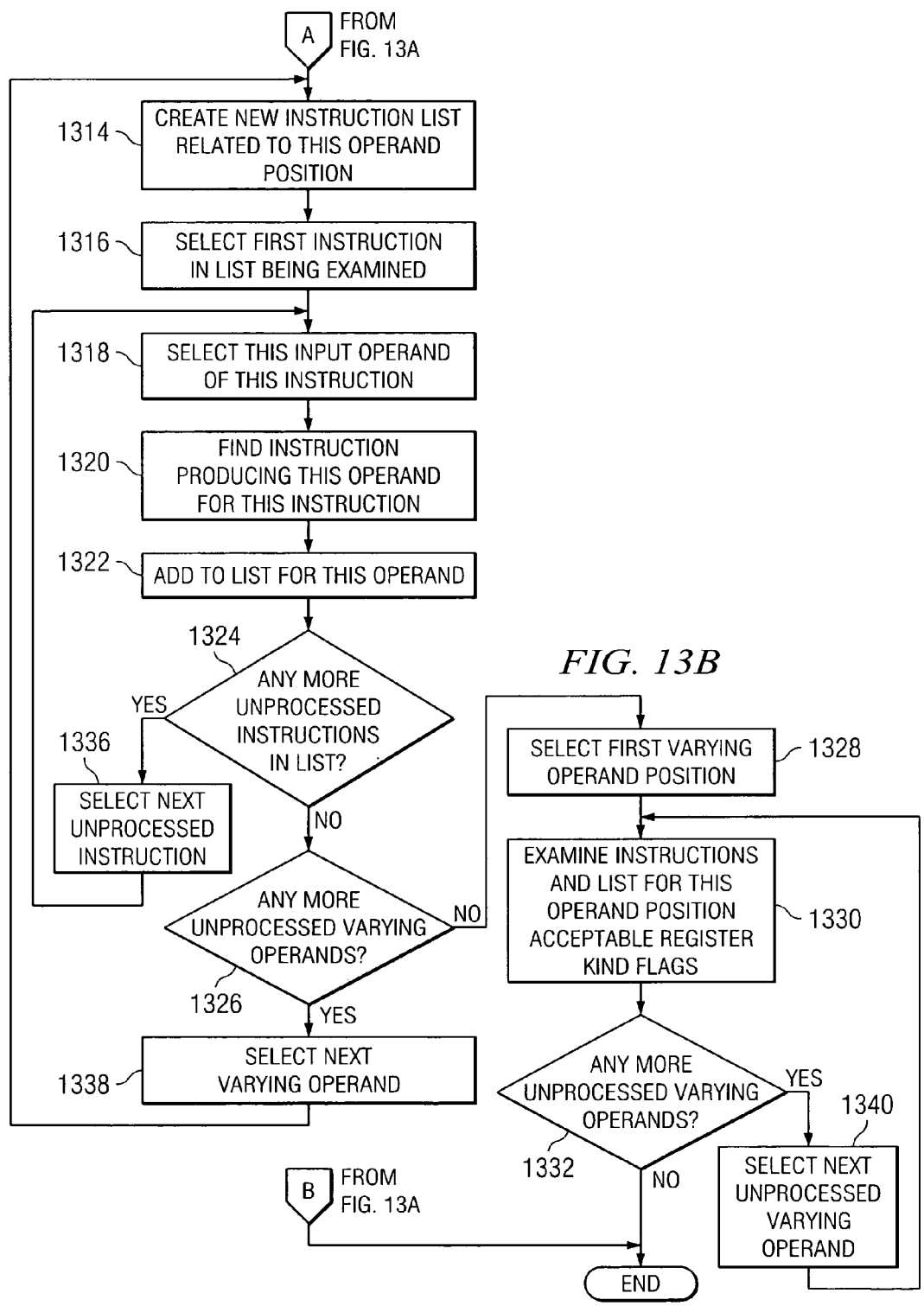

In FIGS. 13A and 13B, a flowchart of a process for examining instructions in a list is depicted in accordance with the preferred embodiment of the present invention. The flowchart in FIGS. 13A and 13B is a more detailed description of step 1210 in FIG. 12.

The process begins by selecting a first instruction in the list being examined (step 1300). All restrictions for this instruction are checked, including that the operation is compatible with the others (step 1302). If any restrictions are not met by the instruction, the process sets the relevant flag or flags to equal false (step 1304). Thereafter, a determination is made as to whether there are any more unprocessed instructions present in the list (step 1306). In step 1306, if additional instructions are present in the list, the next unprocessed instruction in the list being examined is selected (step 1334), with the process returning to step 1302 to check all restrictions for the instruction.

Still referring to step 1306, if unprocessed instructions are not present in the list, a determination is made as to whether the instructions' operations are loads (step 1308). If none of the instruction operations are loads, the process proceeds to determine how many input operands may vary (step 1310). For example, an add operation contains two input operands which may vary from one add to another, while a negate operation contains only a single operand which may vary. In some implementations each may also have non-varying operands such as one indicating that the processor's carry flag might be changed.

The first varying operand position is selected (step 1312). A new empty instruction list related to the currently selected operand position is created (step 1314). Step 1314 works with steps 1316, 1318, 1320, 1322, 1324 and 1336 to construct a list of instructions to be used. Step 1314 creates an empty list.

The first instruction in the list being examined is selected for processing (step 1316). The input operand in the currently selected operand position of this instruction is selected (step 1318). The instruction producing the operand for the instruction is found (step 1320). Steps 1318 and 1320 find an instruction to be added to the list created in step 1314. If the producing instruction cannot be found, either a new instruction may be created which copies the operand to the corresponding position in a wider operand, or this instruction list may be rejected by setting all flags false and exiting. This instruction is appended to the new instruction list for the operand (step 1322), matching the order of the list being examined. Next, a determination is made as to whether any additional unprocessed instructions are present in the list (step 1324).

In step 1324, if additional unprocessed instructions are present in the list, the next unprocessed instruction is selected (step 1336), with the process returning to step 1318 to select the input operand of the instruction in the currently selected position.

With reference again to step 1324, if additional unprocessed instructions are not present in the list, a determination is made as to whether any additional unprocessed varying operands are present (step 1326). In step 1326, if additional unprocessed varying operands are present, the next unprocessed varying operand position is selected (step 1338), with the process returning to step 1314 to create a new instruction list related to the operand position.

In step 1326, if more unprocessed varying operands are not present, the first varying operand position is selected (step 1328). The instructions in the list for that operand position are examined and acceptable register kind flags are updated (step 1330, which is a recursive execution of all the steps in FIG. 13). A determination is made as to whether any more varying operands are present (step 1332). If additional unprocessed varying operands are present, the next unprocessed varying operand position is selected (step 1340), with the process returning to step 1330 to examine the instructions in that list.

Turning back now to step 1332, if no varying operands are present, the process terminates, with the flags indicating which register classes and/or instruction categories are valid and practical for the instruction list being examined. If the process was called recursively from FIG. 13, step 1330, instead of from FIG. 12, step 1208, only the current instance of the process terminates, and execution continues in step 1332 of the calling instance. Eventually the process returns back to step 1210 in FIG. 12 and the acceptable register class or classes for the tree will have been identified.

Thus, the present invention provides an improved method, apparatus, and computer instructions for selecting register classes and/or instruction categories to optimize the execution of code. In particular, the mechanism of the present invention may be used to select register classes and/or instruction categories for generating SIMD instructions. As described above, trees are generated from instructions used to evaluate or process related expressions. These trees are analyzed to identify the best class of registers and/or instruction category to meet a performance goal. A new tree is generated for the identified register class and/or instruction category. New instructions using the register class and/or instruction category are generated from this tree.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing expressions, the method comprising:
    responsive to receiving expressions, identifying parameters for the expressions to form a set of identified parameters;
    identifying each type of execution unit with an instruction category from an existing set of instruction categories, wherein the execution unit can execute instructions needed to process the expressions using the set of identified parameters, wherein a set of identified execution unit types is formed;
    generating a list of acceptable types of registers associated with the set of identified execution types to form a set of registers;
    constructing lists of stores involving adjacent memory;
    for each list of stores, selecting an adjacent subset;
    setting all acceptable register class flags to true;
    examining instructions in lists of store and updating acceptable register kind flags;
    selecting a combination of an execution unit type from the set of identified execution unit types and an acceptable register from the set of registers, to meet a performance goal; and
    generating replacement instructions for the combination to process the expressions.

2. The method of claim 1 further comprising:
    selecting an instruction category from the replacement instructions to process the expression.

3. The method of claim 1, wherein the expressions are located within original instructions and the replacement instructions are new instructions generated to process the expression.

4. The method of claim 1 further comprising:
    generating a set of instructions to process the expressions, wherein the set of instructions use executions units from the execution unit type.

5. The method of claim 1, wherein the set of identified execution unit types includes at least one of general purpose registers, floating point registers, and vector registers.

6. The method of claim 1, wherein the execution unit type is identified by or identifies a register class.

7. The method of claim 1, wherein the parameters include at least one of an operation performed, a type of data used by the expression, and a data size.

8. The method of claim 1, wherein the identifying step includes:
generating ordered lists of load instructions and ordered lists of store instructions to process the expression.

9. A data processing system for generating instructions to process expressions, the data processing system comprising:
a bus;
a communications unit connected to the bus;
a memory connected to the bus;
a processor unit connected to the bus; wherein the processor executes:
first identifying means, responsive to receiving expressions, for identifying parameters for the expressions to form a set of identified parameters;
second identifying means for identifying each type of execution unit with an instruction category from an existing set of instruction categories, wherein the execution unit can execute instructions needed to process the expressions using the set of identified parameters, wherein a set of identified execution units types is formed;
first generating means for generating a list of acceptable types of registers associated with the set of identified execution types to form a set of registers;
constructing means for constructing lists of stores involving adjacent memory;
selecting means, for each list of stores, for selecting an adjacent subset;
setting means for setting all acceptable register class flags to true;
examining means for examining instructions in lists of store and updating acceptable register kind flags;
selecting means for selecting a combination of an execution unit type from the set of identified execution unit types and an acceptable register from the set of registers to meet a performance goal; and
second generating means for generating replacement instructions for the combination to process the expressions.

10. The data processing system of claim 9 wherein second generating means further comprises:
generating means for generating a set of instructions to process the expressions, wherein the set of instructions use execution units from the execution unit type.

11. A computer program product for generating instructions to process expressions, the computer program product comprising:
a computer usable recordable-type medium containing instructions, executable by a computer stored thereon, the instructions comprising:
instructions executable by the computer, responsive to receiving expressions, for identifying parameters for the expression to form a set of identified parameters;
instructions executable by the computer for identifying each type of execution unit with an instruction category from an existing set of instruction categories, wherein the execution unit can execute instructions needed to process the expressions using the set of identified parameters, wherein a set of identified execution units types is formed;
instructions executable by the computer for generating a list of acceptable types of registers associated with the set of identified execution types to form a set of registers;
instructions executable by the computer for constructing lists of stores involving adjacent memory;
instructions executable by the computer for, for each list of stores, selecting an adjacent subset;
instructions executable by the computer for setting all acceptable register class flags to true;
instructions executable by the computer for examining instructions in lists of store and updating acceptable register kind flags;
instructions executable by the computer for selecting a combination of an execution unit type from the set of identified execution unit types and an acceptable register from the set of registers to meet a performance goal; and
instructions, executable by the computer for generating replacement instructions for the combination to process the expressions.

12. The computer program product of claim 11 further comprising:
instructions executable by the computer for selecting an instruction category from the instructions to process the expressions.

13. The computer program product of claim 11, wherein the expressions are located within original instructions and the replacement instructions are new instructions generated to process the expressions.

14. The computer program product of claim 11 further comprising:
instructions executable by the computer for generating a set of instructions to process the expressions, wherein the set of instructions use execution units from the execution unit type.

15. The computer program product of claim 11, wherein the set of identified execution unit types includes at least one of general purpose registers, floating point registers, and vector registers.

16. The computer program product of claim 11, wherein the execution unit type is identified by or identifies a register class.

17. The computer program product of claim 11, wherein the parameters include at least one of an operation performed, a type of data used by the expression, and a data size.

18. The computer program product of claim 11, wherein the instructions executable by the computer include:
instructions executable by the computer for generating ordered lists of load instructions and ordered lists of store instructions to process the expressions.

19. A data processing system comprising:
a bus;
a communications unit connected to the bus;
a memory connected to the bus, wherein the memory includes a plurality of instructions; and
a processor unit connected to the bus, wherein the processor unit executes the plurality of instructions to;
identify parameters for the expressions to form a set of identified parameters in response to receiving expressions;
identify each type of execution unit with an instruction category from an existing set of instruction categories, wherein the execution unit can execute instructions needed to process the expressions using the set of identified parameters, wherein a set of identified execution units types is formed;

generate a list of acceptable types of registers associated with the set of identified execution types to form a set of registers, construct lists of stores involving adjacent memory;

for each list of stores, select an adjacent subset;

set all acceptable register class flags to true;

examine instructions in lists of store and updating acceptable register kind flags;

and select a combination of an execution unit type from the set of identified execution unit types and an acceptable register from the set of registers to meet a performance goal; and generate replacement instructions from the combination to process the expressions.

20. The data processing system of claim 19, wherein the processor unit further executes the plurality of instructions to generate a set of instructions to process the expressions, wherein the set of instructions use executions units from the execution unit type.

21. The data processing system of claim 19, wherein the set of identified execution unit types includes at least one of general purpose registers, floating point registers, and vector registers.

22. The data processing system of claim 19, wherein the execution unit type is identified by or identifies a register class.

23. The data processing system of claim 19, wherein the parameters include at least one of an operation performed, a type of data used by the expression, and a data size.

* * * * *